March 3, 1936.　　　E. SCHILLING　　　2,033,011
FRYING PAN
Filed Oct. 8, 1935　　　2 Sheets-Sheet 1
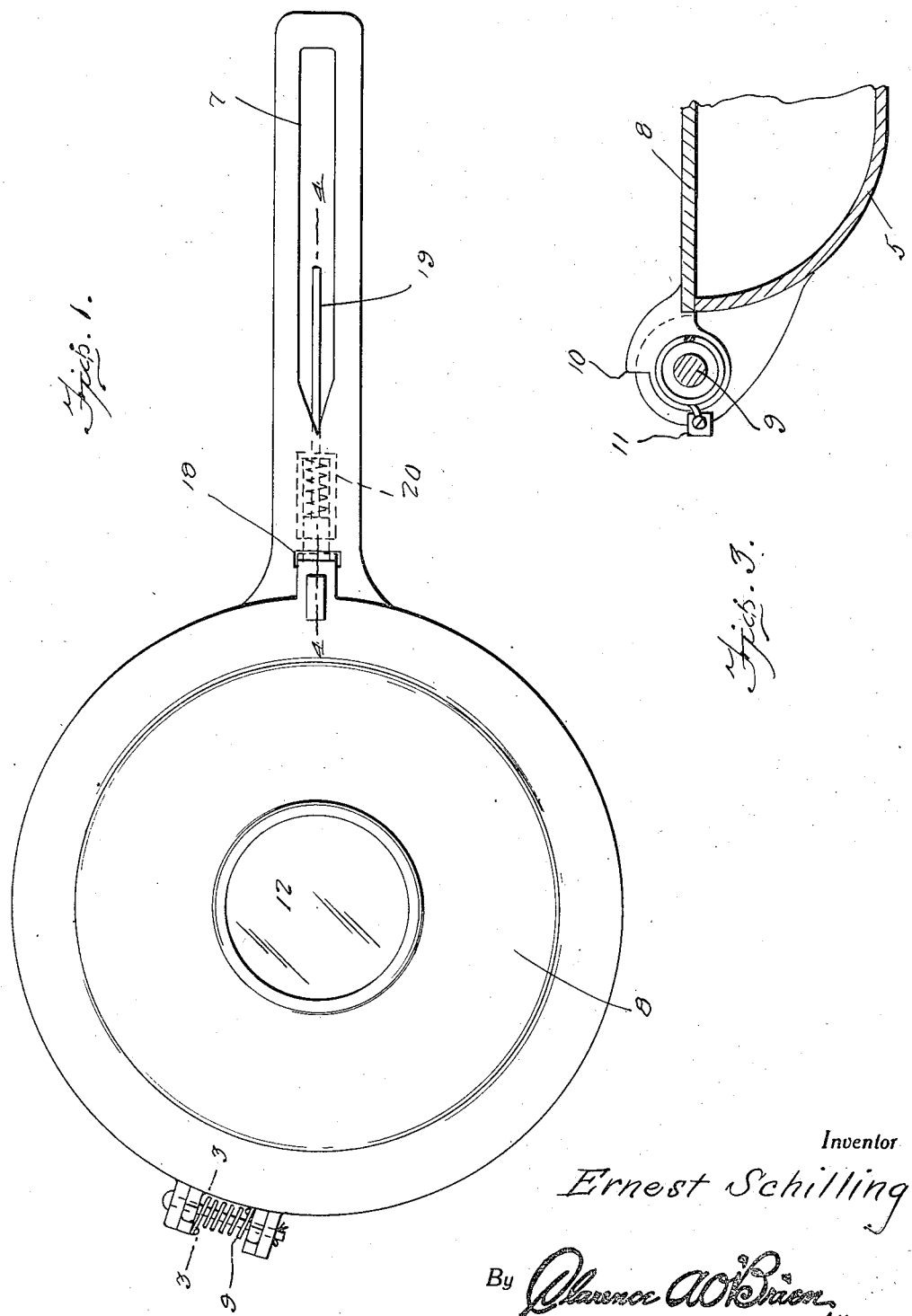
Inventor
Ernest Schilling
By Clarence A. O'Brien
Attorney

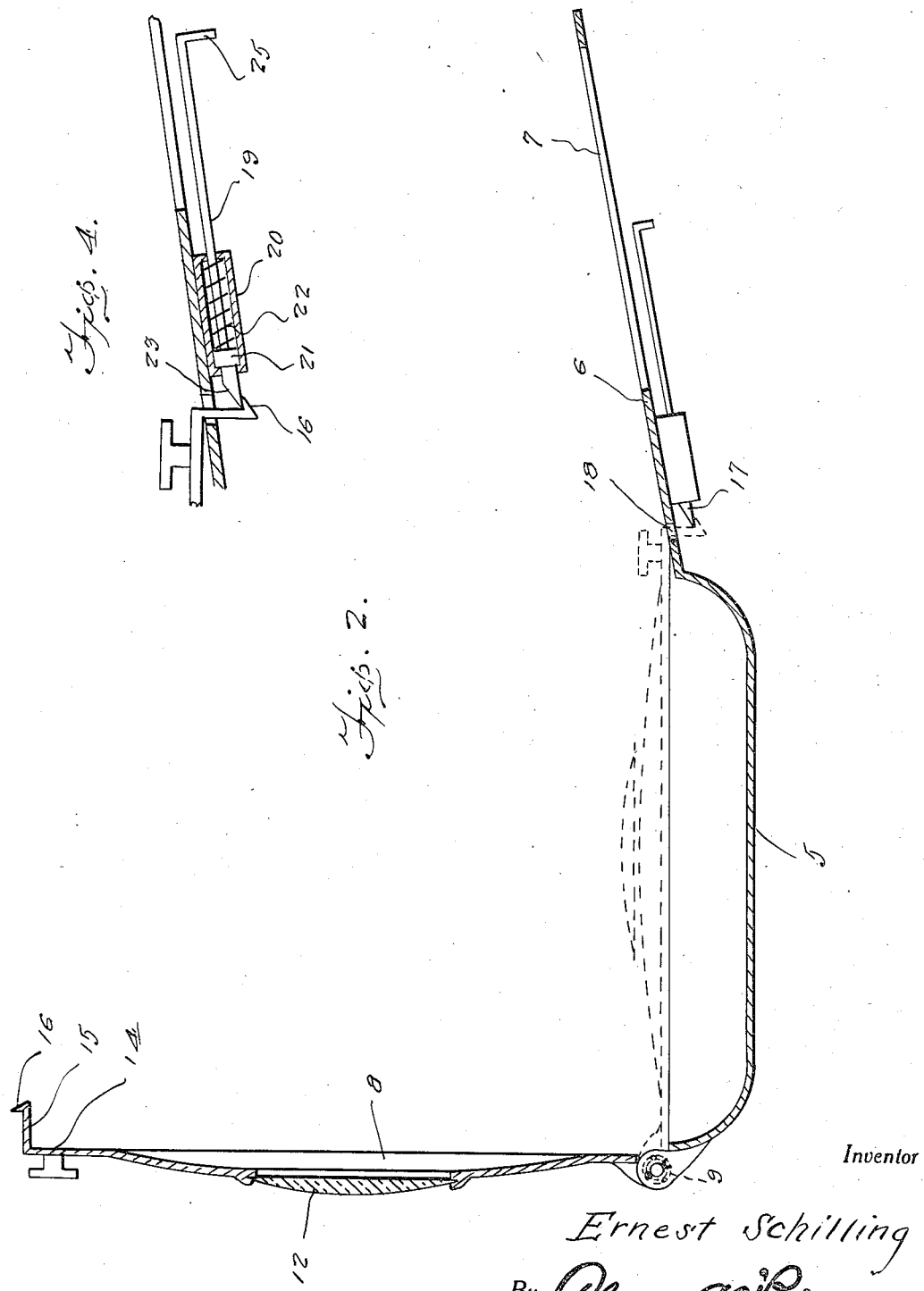

Patented Mar. 3, 1936

2,033,011

UNITED STATES PATENT OFFICE 2,033,011

FRYING PAN

Ernest Schilling, Philadelphia, Pa.

Application October 8, 1935, Serial No. 44,099

1 Claim. (Cl. 53—7)

The present invention relates to a frying pan having a lid swingably mounted thereon and the lid is provided with a transparent panel incorporated therein and means whereby the lid normally swings to open position and further means for holding the lid in closed position.

Another very important object of the invention resides in the provision of a frying pan having the above features in an extremely simple and economical arrangement and whereby the pan possesses durability, easy manipulation, and being otherwise well adapted for the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a top plan view of a pan embodying the features of my invention showing the lid closed.

Figure 2 is a longitudinal section through the pan showing the lid open.

Figure 3 is an enlarged detail section taken substantially on the line 3—3 of Figure 1.

Figure 4 is a detail sectional view taken substantially on the line 4—4 of Figure 1.

Referring to the drawings in detail it will be seen that the numeral 5 denotes the pan having an elongated handle 6 extending therefrom and provided with an elongated slot 7. Numeral 8 denotes a lid for the pan and numeral 9 denotes generally a spring hinge connecting the lid with the pan so that the lid is normally in an open position. Numerals 10 and 11 denote the shoulders incorporated in the hinge structure 9 to limit the movement of the lid 8 in its open position. In the center of the lid there is incorporated therein a transparent panel 12 so that the egg being fried may be watched while the lid is closed. The lid is provided with an extension 14 opposite the hinge and this extension has a finger 15 disposed at right angles to the extension and formed at its extremity with a shoulder 16. Numeral 17 denotes a bolt for engaging the shoulder 16. The handle 6 is provided with an opening 18 through which the finger 15 is disposed when the lid is in closed position. The bolt 17 has a shank 19 slidable through the ends of a casing 20 fixed under the handle. A piston-like block 21 is slidable in the casing and formed or fixed to the shank 19. A spring 22 impinges against the block 21 for normally holding the bolt in its extended or engaging position. The bolt is bevelled as at 23 for cooperating with the under-beveled portion of the shoulder 16.

The outer extremity of the shank is provided with a finger extension 25 so that the bolt may be readily operated.

It is thought that the construction, operation, utility and advantages of this invention will now be readily understood without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

In a cooking utensil and in combination, a frying pan having a lid hingedly connected thereto, resilient means normally urging said lid to open position, a depending hook on said lid, said pan having a laterally extending handle with an aperture therein adjacent the pan in which the hook is receivable, a catch casing on the under side of said handle, a catch slidable in said casing and engageable with said hook for securing said lid in a closed position, resilient means normally urging said hook to its operative position, and an operating rod on said catch having a depending finger actuating arm on the free end thereof.

ERNEST SCHILLING.